F. J. PHILBROOK.
REELS FOR FISHING-LINES.

No. 191,813.  Patented June 12, 1877.

Witness  Inventor

UNITED STATES PATENT OFFICE.

FRANCIS J. PHILBROOK, OF BANGOR, MAINE, ASSIGNOR TO HIRAM L. LEONARD, OF SAME PLACE.

IMPROVEMENT IN REELS FOR FISHING-LINES.

Specification forming part of Letters Patent No. 191,813, dated June 12, 1877; application filed May 10, 1877.

*To all whom it may concern:*

Be it known that I, FRANCIS J. PHILBROOK, of Bangor, in the county of Penobscot and State of Maine, have invented certain new and useful Improvements in Reels for Fishing-Lines; and do hereby declare that the following is a full, clear, and exact description thereof, that will enable others skilled in the art to which it appertains to make and use the same, reference being had to the accompanying drawings, forming a part of this specification, in which—

Figure 3:
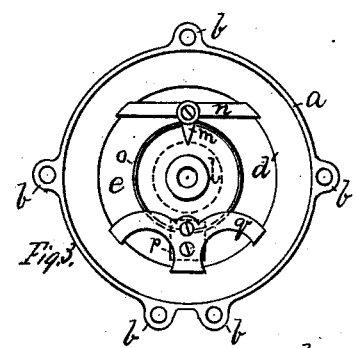
Figure 1:
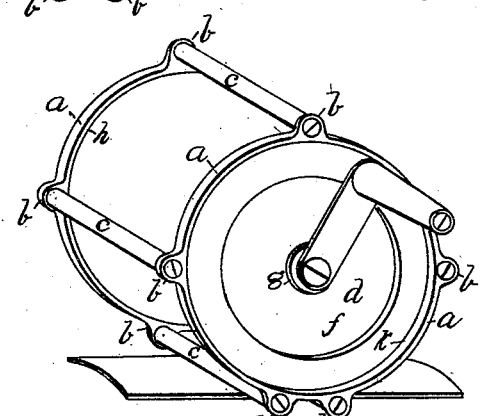
Figure 2:
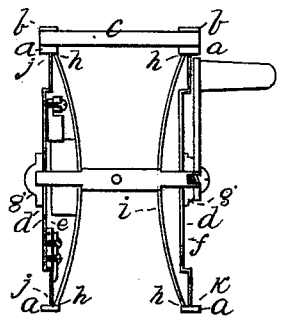

Figure 1 shows a perspective, Fig. 2 a vertical section, and Fig. 3 an inside view of side $d'$, showing arrangement of click mechanism.

Same letters show like parts.

The object of my invention is to produce a reel for fishing-lines which shall be light and strong, and capable of carrying a large quantity of line in proportion to its size and weight. It further consists in a peculiar construction and arrangement of the click mechanism adapted to this form of reel.

My invention will be readily understood by reference to the accompanying drawing.

My reel is constructed with an annular frame, $a$, provided with offsets $b\ b$, through which pass the cross-bars $c$, which unite the sides of the reel to each other.

The sides $d\ d'$ of the reel are secured within this frame, and are of thin metal, "struck up" to give stiffness, and for the purpose of forming the internal and external recesses $e f$, the former, in the side $d'$, containing the click mechanism, and the latter, in the side $d$, adding to the beauty of the reel, and tending to prevent scratching of the polished face by the handle or crank. Bearings $g\ g'$ for the journal of the spool are soldered or otherwise secured at the center of the sides $d\ d'$. These thin metal sides are, as before stated, secured in the frames $a\ a$, which are made of sufficient width on the edge to project beyond said sides $d\ d'$, forming rims $h\ h$ on the inside for the reception of the spool $i$, and $j\ k$ on the outer sides, both serving for ornamentation and as a guard for the side plates $d\ d'$, and the latter acting as a rim, within which the handle travels, thus preventing the entanglement of the line.

My click mechanism is shown in Fig. 3. The ratchet $l$, as usual, is secured to the spool-journal, revolving with it. The dog $m$ is secured by a screw, upon which it moves, as a pivot to a cross-piece, $n$, which is soldered upon the inside of the side $d'$, while the spring $o$ is secured in a small block, $p$, which is attached by screws to a second cross-piece, $q$, also soldered to the side $d'$. This arrangement enables all the parts to be readily removed for repairs, and gives them additional strength.

What I claim as my invention, and desire to secure by Letters Patent, is—

1. In a reel for fishing-lines, the combination of the thin metal sides $d\ d'$, having recesses $e f$ struck up therein, with a frame, $a\ a$, forming flanges or rims $h\ h$ and $k$ around said sides, as and for the purposes herein described.

2. In a fishing-reel having a recessed side to contain the click mechanism, the combination of the cross-pieces $n\ q$, in combination with the block $p$, spring $o$, and dog $m$, arranged substantially as and for the purposes set forth.

In testimony that I claim the foregoing I have hereunto set my hand this 7th day of February, 1877.

FRANCIS J. PHILBROOK.

Witnesses:
WM. FRANKLIN SEAVEY,
JOHN R. MASSON.